(12) United States Patent
Meah et al.

(10) Patent No.: US 9,343,884 B2
(45) Date of Patent: May 17, 2016

(54) MOUNTING UNIT

(75) Inventors: Faruk Meah, Woking (GB); Steven Ian Bennett, Spelthorne Grove (GB); Josef Prokop, Vysoke Popovice (CZ); Paul Jon Taylor, Woking (GB)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 256 days.

(21) Appl. No.: 13/877,038

(22) PCT Filed: Oct. 3, 2011

(86) PCT No.: PCT/GB2011/001440
§ 371 (c)(1),
(2), (4) Date: Aug. 2, 2013

(87) PCT Pub. No.: WO2012/042232
PCT Pub. Date: Apr. 5, 2012

(65) Prior Publication Data
US 2013/0306365 A1 Nov. 21, 2013

(30) Foreign Application Priority Data
Oct. 1, 2010 (GB) .................................. 1016564.5

(51) Int. Cl.
*F16M 13/02* (2006.01)
*H02G 3/20* (2006.01)
*H02G 3/12* (2006.01)
*H02G 1/00* (2006.01)

(52) U.S. Cl.
CPC . *H02G 3/20* (2013.01); *H02G 1/00* (2013.01); *H02G 3/123* (2013.01); *Y10T 29/49948* (2015.01)

(58) Field of Classification Search
USPC .................. 248/27.1, 27.3, 342, 343, 906
See application file for complete search history.

(56) References Cited

U.S. PATENT DOCUMENTS

| | | | |
|---|---|---|---|
| 2,297,862 A | 10/1942 | Bachmann | |
| 3,871,606 A * | 3/1975 | Larson et al. | 248/27.1 |
| 3,872,296 A * | 3/1975 | Cohen et al. | 362/366 |
| 4,053,082 A | 10/1977 | Ullman | |
| 4,098,423 A | 7/1978 | Marrero | |
| 5,143,339 A * | 9/1992 | Ashcraft et al. | 248/343 |
| 5,204,499 A * | 4/1993 | Favalora | 174/669 |

(Continued)

FOREIGN PATENT DOCUMENTS

WO 2010/008778 A2 1/2010

OTHER PUBLICATIONS

International Search Report mailed Feb. 11, 2013, from International Application No. PCT/GB2011/001440 filed on Oct. 3, 2011.

(Continued)

*Primary Examiner* — Steven Marsh
(74) *Attorney, Agent, or Firm* — HoustonHogle, LLP (57) ABSTRACT

A mounting unit (10) for mounting an electrical component (16) to a panel has a first member (12) arranged to engage a first side of said panel and a second member (14) arranged to engage the first member and a second, opposite side of said panel, so as to secure the first and second members to opposite sides of the panel through a hole in the panel. The first and second members define a space for receiving the electrical component. The mounting unit is particularly suitable for mounting the electrical component to a ceiling tile.

26 Claims, 7 Drawing Sheets

(56) References Cited

U.S. PATENT DOCUMENTS

| | | | |
|---|---|---|---|
| 6,505,960 B2 * | 1/2003 | Schubert et al. | 362/365 |
| 6,533,225 B1 | 3/2003 | Berges et al. | |
| 2005/0072891 A1 * | 4/2005 | Wright | 248/342 |
| 2010/0050538 A1 | 3/2010 | Struthers et al. | |
| 2010/0084155 A1 | 4/2010 | Jafari | |
| 2013/0319752 A1 * | 12/2013 | Cowles et al. | 174/491 |

OTHER PUBLICATIONS

European Search Report, mailed Jan. 24, 2014, from European Application No. 11773112.5, filed Oct. 3, 2011.

* cited by examiner

MOUNTING UNIT

This invention relates to a mounting unit and, more particularly, to a mounting unit for mounting an electrical component to a panel, such as a ceiling tile. The invention also relates to an electrical component for mounting in a mounting unit, and a mounting method.

Detector systems, such as fire detection systems or intruder detection systems are commonplace in buildings. A detector system typically includes a plurality of detector units, sounders and beacons located around the building and connected to a central control unit. In a fire detection system for example, there might be flame detectors, smoke detectors, heat detectors and carbon monoxide detectors all connected to, and in communication with, the control unit.

When installing a detector system, such as a fire detector system, in a building, it is usually desirable for the detector units to be located on the ceiling. In buildings which have ceiling tiles forming part or all of the ceiling, it is desirable to mount detector units through the ceiling tiles so that the space beneath the tile can be monitored, but any wiring and mounting brackets are concealed above the tile.

Before a suspended ceiling is installed, the wiring for the detectors, and any other electrical components that are to be mounted through the ceiling tiles, must be installed by an electrician. Only then can the ceiling, made up of an expanse of ceiling tiles, be installed by a ceiling installer. Since the person who installs the ceiling is, typically, not qualified to install and commission detectors, once the ceiling is installed, the electrician must return to fit the detectors and other electrical components into the ceiling tiles and commission them. Therefore, the electrician must make an extra visit, which incurs greater cost. It is desirable, therefore, to make it possible for the ceiling installer to mount the detector units in the ceiling after the ceiling has been installed without the need for the electrician to return.

An existing solution to the above-identified problem is a connection unit which allows attachment of an electrical component to a ceiling tile or a ceiling. It is arranged such that, during the electrician's only visit, the wiring can be installed with wired-in back boxes positioned where the detectors will finally go. A detector can be attached to the back box and the system commissioned before the ceiling is even installed. The ceiling installer then installs the ceiling, and cuts holes in ceiling tiles which correspond to the position of the detectors. The existing connection unit is a two-piece structure comprising the back box which is inserted through the hole in the ceiling tile from above, and a front rim which snap-fits onto the back box once in position from below the ceiling tile. The back box has spring arms that push down against the upper surface of the ceiling tile to hold the front rim tight against the underside of the tile. To install the unit, one must reach around to the top of the tile, holding the back box in the hole, while trying to line up three snap-fitting prongs on the front rim with receiving holes in the back box as the front rim is attached to the underside of the tile. While this permits the ceiling installer to do the final positioning of the detector without the electrician returning, everything must be done by him at ceiling level while balancing on a ladder.

According to a first aspect of the present invention, a mounting unit for mounting an electrical component to a panel comprises a first member arranged to engage a lower side of said panel, the first member being a bezel; and a second member arranged to engage the first member and an upper, opposite side of said panel, so as to secure the first and second members to opposite sides of the panel through a hole in the panel; wherein the first and second members define a space for receiving the electrical component from above the mounting unit. By introducing the electrical component from above, (that is, from behind the panel), the component can already be wired into the electrical system above the panel, and does not require the attendance of an electrician or other specialist.

Neither the first member nor the second member is an electrical component. The electrical component can be connected to the mounting unit. An advantage of the mounting unit being separate to the electrical component is that the mounting unit can be fitted to a ceiling tile before the ceiling tile is installed. Thus, the mounting unit can be fitted at ground level. The electrical component can be wired in before the ceiling tiles are installed and, once the ceiling tiles have been installed, the electrical component can easily be mounted in the mounting unit by pulling it through from above.

Preferably, the mounting unit includes a connector for securing the members to one another. The connector may comprise complementary ratchet portions. Advantageously, one of the first and second members includes a plurality of locking ridges, the slope of which extends in a first direction, and the other of the first and second members includes one or more locking ridges, the slope of which extends in a second direction substantially opposite to the first direction. This allows them to lock together. The ratchet portions allow the first and second members of the mounting unit to be fitted to ceiling tiles of different thicknesses. Owing to the ratchet portions being capable of forming a secure connection over a range of thicknesses, the mounting unit can be fitted to ceiling tiles ranging in thickness from around 1 mm to around 30 mm.

Preferably, the bezel comprises a bezel ring arranged to abut the panel to which the mounting unit it is to be fitted. The bezel ring may have a flat side for abutting the ceiling tile, and an opposite, chamfered side, which is visible once the mounting unit has been mounted on the ceiling tile.

Advantageously, the mounting unit comprises a rotation restrictor for restricting rotation of the electrical component relative to the mounting unit. The rotation restrictor may comprise at least one tooth in one member, arranged to engage a complementary recess in the other. An advantage of the rotation restrictor is that the electrical component is prevented from rotating within the mounting unit and, therefore, its wires are prevented from becoming tangled, loosened or disconnected.

The mounting unit may further comprise a catch for securing the electrical component thereto. Preferably, the catch comprises at least one cantilever arm, the or each arm being arranged to engage and secure the electrical component to the mounting unit. The catch may comprise a snap-fit arrangement. This has an advantage in that the electrical component can easily be secured into the mounting unit, after the mounting unit has been mounted to the ceiling tile. A further advantage is that the electrical component will remain in the same position, and is unlikely to be inadvertently moved from its location. It is also important that the electrical component is not intentionally moved from its location, and its movement is prevented by its secure connection to the mounting unit members which are secured to one another.

Preferably, the second member comprises a ring arranged to abut the panel to which the mounting unit it is to be fitted.

Advantageously, the mounting unit further comprises a panel locator for restricting rotational movement of the mounting unit relative to said panel. The ring of the second member may comprise at least one hole for receiving a screw for securing the second member to the panel. An advantage of this is that the mounting unit can be more permanently secured to the ceiling tile, if desired.

The panel locator may comprise a spur arranged to engage said panel in use. This has an advantage that the mounting unit, and hence the electrical component mounted in the mounting unit, is prevented from rotating and, therefore, the wires connected to the electrical component are prevented from getting tangled or disconnected.

The mounting unit may further comprise a resilient arm arranged to engage said panel in use. A spur may extend from the resilient arm and, more specifically, the spur may extend substantially perpendicularly from the resilient arm. An advantage of the resilient arm is that the second member of the mounting unit is urged upwards, effectively pulling the first member tight against the ceiling tile.

Preferably, the second member comprises a hole adjacent to the connector for securing the members to one another. An advantage of the hole is that it allows access to the connector for securing the members, so that, if desired, the connector can be released, and the members can be separated.

Advantageously, the first and second members of the mounting unit are shaped such that relative rotation of said members is restricted. The restriction of the relative rotation of the first and second members may result from a complementary protrusion and recess. The protrusion may be formed on one of the first and second members, and the complementary recess may be formed on the other of the first and second members. As well as advantage of preventing each member from rotating relative to the other member, the shape of the members ensures that they are correctly aligned with respect to one another when installed. Unless the protrusion is aligned with the recess, the first and second members will not fit together securely.

Preferably, the panel to which the mounting unit is mounted is a ceiling tile. Alternatively, the panel may be a ceiling, a wall, a floor, or any other panel to which it might be desirable to mount the mounting unit. References above to the lower side of the panel correspond to the finished side of the panel, and those to the upper side correspond to the unfinished side of the panel which is not normally visible. The electrical component is introduced into the mounting unit from the 'hidden' unfinished side.

According to a second aspect of the present invention, an electrical component is provided for mounting in the mounting unit. The electrical component may be a detector, such as a flame, smoke, heat or gas detector, a light, a speaker, an alarm activation unit, a control panel or any other electrical component.

The electrical component may comprise a rotation restrictor for restricting rotation thereof relative to the mounting unit. The rotation restrictor may comprise a protrusion arranged to abut a complimentary protrusion on the mounting unit.

According to a third aspect of the invention, a method of mounting an electrical component to a panel through a hole comprises the steps of: a) prior to installing the panel, locating a first member of a mounting unit on a lower side of said panel; b) securing a second member of the mounting unit to the first member, on the upper side of said panel; c) installing the panel; and d) inserting the electrical component into the mounting unit from above the unit. An advantage of the method is that the mounting of the mounting unit to the panel, and the mounting of the electrical component in the mounting unit can be done by almost any person. Only the wiring of the electrical component need be done by a skilled electrician. The steps of the method can be done at some later time, once the wiring has been completed, and the ceiling has been fitted.

Additionally, steps a) and b) can be carried out on the ground, and not up a ladder, which makes it safer, quicker and more convenient According to a fourth aspect of the invention, a mounting unit and electrical component combination comprises a mounting unit including a first member and a second member, the first and second members arranged to secure to one another either side of a panel through a hole in the panel; and an electrical component arranged to fit into a recess formed in the mounting unit.

The invention will now be described in greater detail, by way of example, with reference to the drawings, in which.

Figure 1:
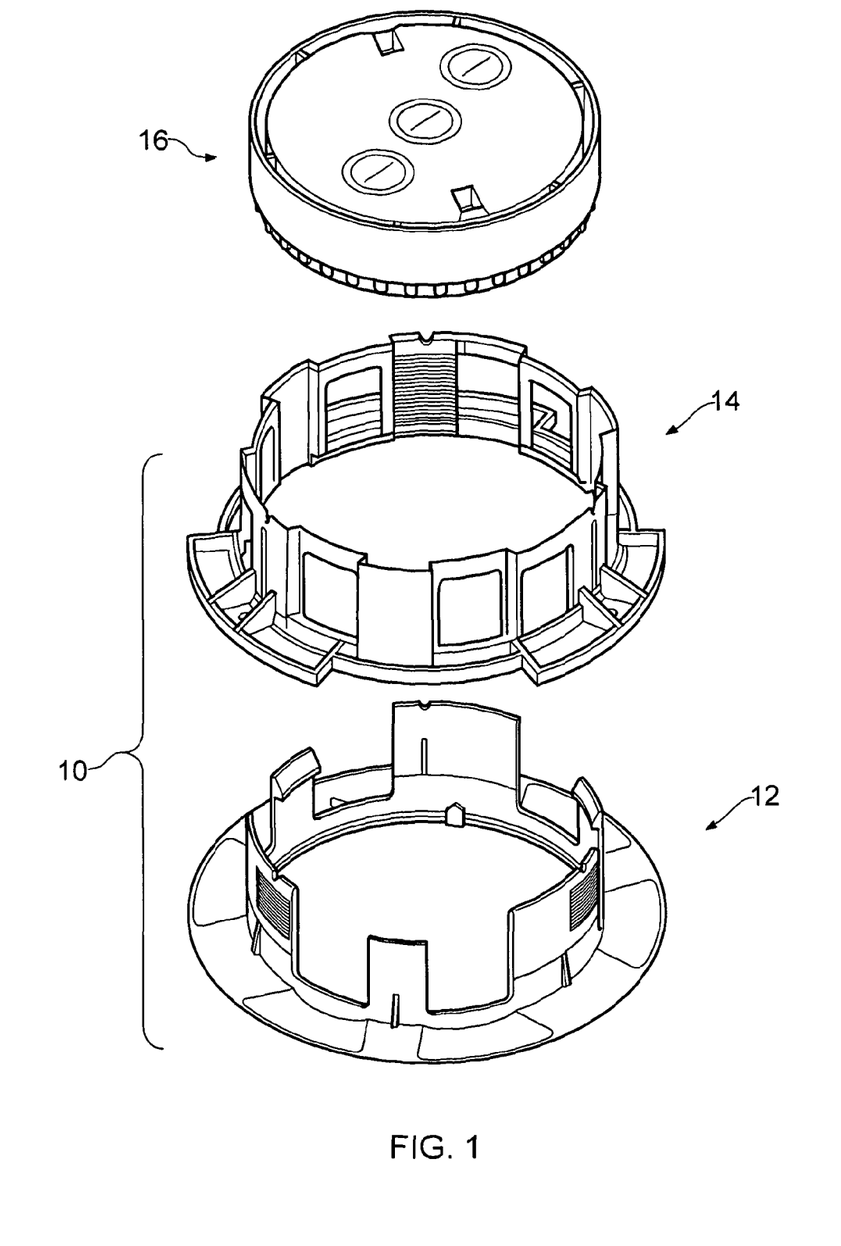
FIG. 1 is an exploded perspective view of an electrical component and a mounting unit for mounting the electrical component to a panel.

Referring to the drawings, FIG. 1 shows a mounting unit 10 comprising a first part 12 in the form of a bezel, and a second part 14 in the form of a clamp. An electrical component 16 is arranged to be received and secured in the mounting unit 10, and will be described in greater detail with reference to FIG. 4. The embodiment of the mounting unit 10 described herein is intended for mounting an electrical component to a ceiling tile, and will be described as such. However, it will be apparent to one skilled in the art that the mounting unit could be used to mount an electrical component to any other suitable panel that has a cavity behind the panel large enough to receive an electrical component and its associated wiring. Thus, the mounting unit could be used to mount an electrical component to a panel such as a suspended ceiling, a wall, or an item of furniture.

The term "bezel" used herein describes the first part 12 of the mounting unit 10. The bezel 12 is arranged to connect to the clamp 14, and includes a bezel ring for surrounding any electrical component mounted in the mounting unit and for concealing the hole in the panel to which the mounting unit is to be mounted.

The term "clamp" used herein describes the second part 14 of the mounting unit 10. The clamp 14 is arranged to be secured to the bezel 12, thereby clamping the panel between the bezel and the clamp.

The term "panel" used herein describes an object to which the mounting unit 10 is intended to be fitted. The term panel may include, but is not restricted to a wall, a board, a panel, a tile or another surface having a cavity behind it, and having a thickness small enough to be clamped between the bezel 12 and the clamp 14. The panel will usually have a finished and unfinished side. In the case of a ceiling tile, the finished side is the lower side when the tile is fitted, and the unfinished side is the upper side which is not in general view.

The term "electrical component" used herein describes any component which must be connected to an electrical power supply to function. An example of such an electrical component 16 is a smoke detector, a flame detector, a heat detector, a toxic gas detector, such as a carbon monoxide detector, a speaker, a light, a control panel, an isolation unit, a motion sensor, a camera, a microphone or an alarm activation unit. The electrical component 16 may alternatively comprise a back box to which electrical connections may be made. A front box, or housing containing measuring or detecting equipment may then be connected to the back box.

Figure 2:
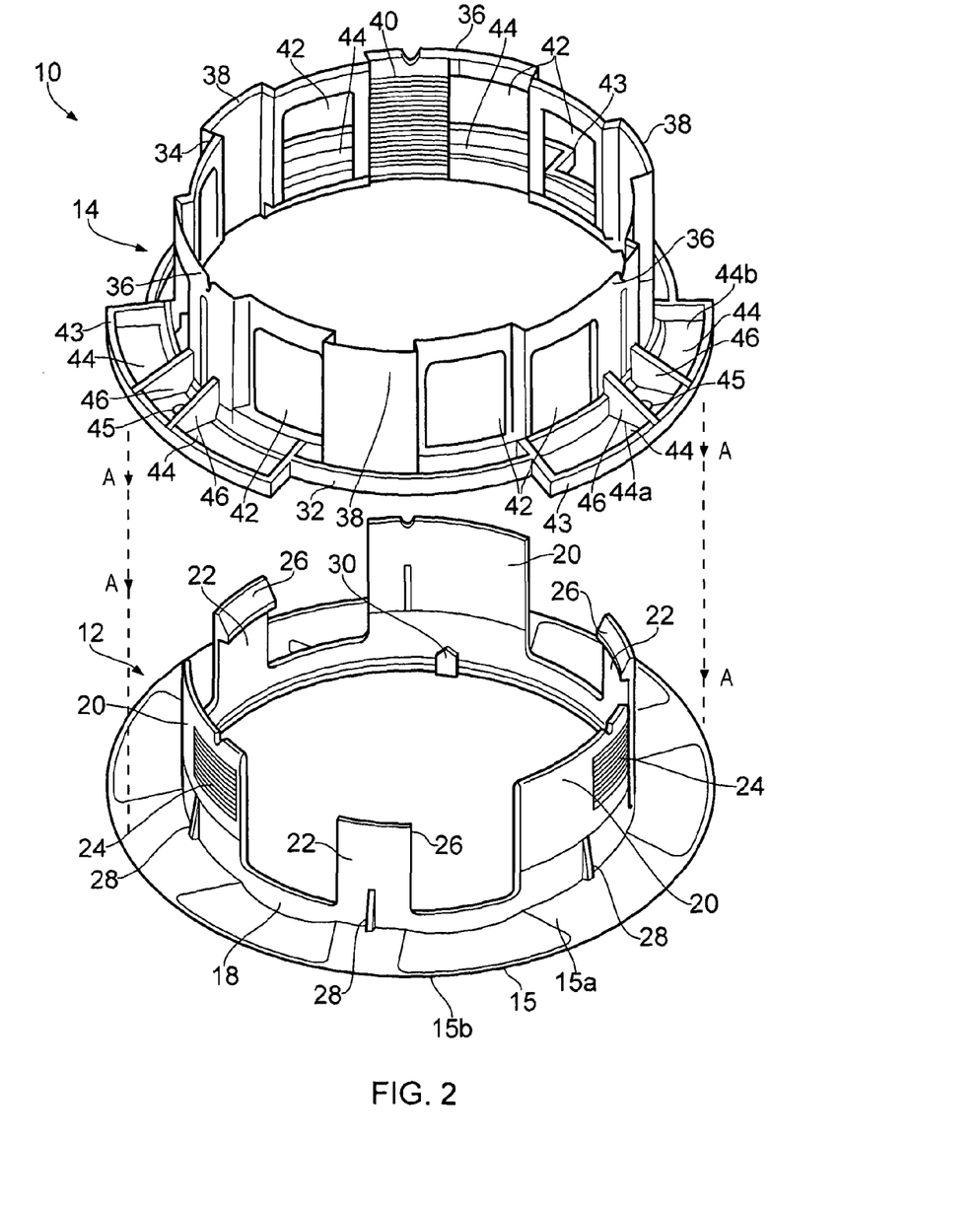
FIG. 2 is a perspective view of the bezel and clamp of the mounting unit shown in FIG. 1.

FIG. 2 shows the bezel 12 and the clamp 14 in greater detail. The bezel 12 comprises a substantially circular bezel ring 15, having a first side 15a which is substantially flat, and a second, chamfered surface 15b. When the mounting unit 10 is mounted to a panel, the flat surface 15a of the bezel ring 15 abuts the panel to which the mounting unit is to be fitted and is, therefore, not visible when mounted. The chamfered surface 15b is generally visible when the mounting unit 10 is in its mounted position. The bezel 12 is normally present to surround an electrical component where that component is positioned in a hole in a ceiling or wall or other panel so as to conceal the internal edge of the hole and leave an aesthetically pleasing finish. Thus, it will be appreciated that the bezel 12 is located against the side of the panel which is generally visible.

Figure 5:
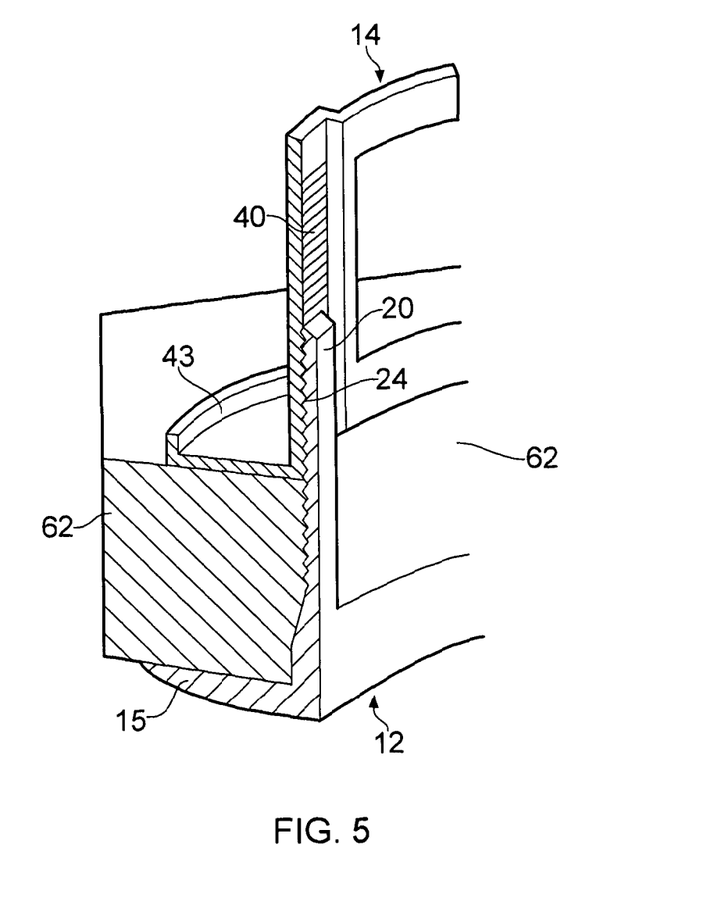
FIG. 5 is an enlarged cross-sectional view of a part of the mounting unit mounting on a panel.

A substantially cylindrical wall 18 extends from an inner edge of the bezel ring 15. The wall 18 extends from the flat side 15a of the bezel ring 15, and is shaped so as to fit through a hole cut in the panel to which the mounting unit 10 is to be mounted. Arms 20, 22 extend from the wall 18. The arms 20 comprise a plurality of wedge-shaped locking ridges 24 extending from an outer surface thereof. The ridges 24 form part of a ratchet closure member which will be discussed in greater detail with reference to FIG. 5. The ridges 24 extend from one edge of each arm 20 approximately half way across each arm.

Figure 6:
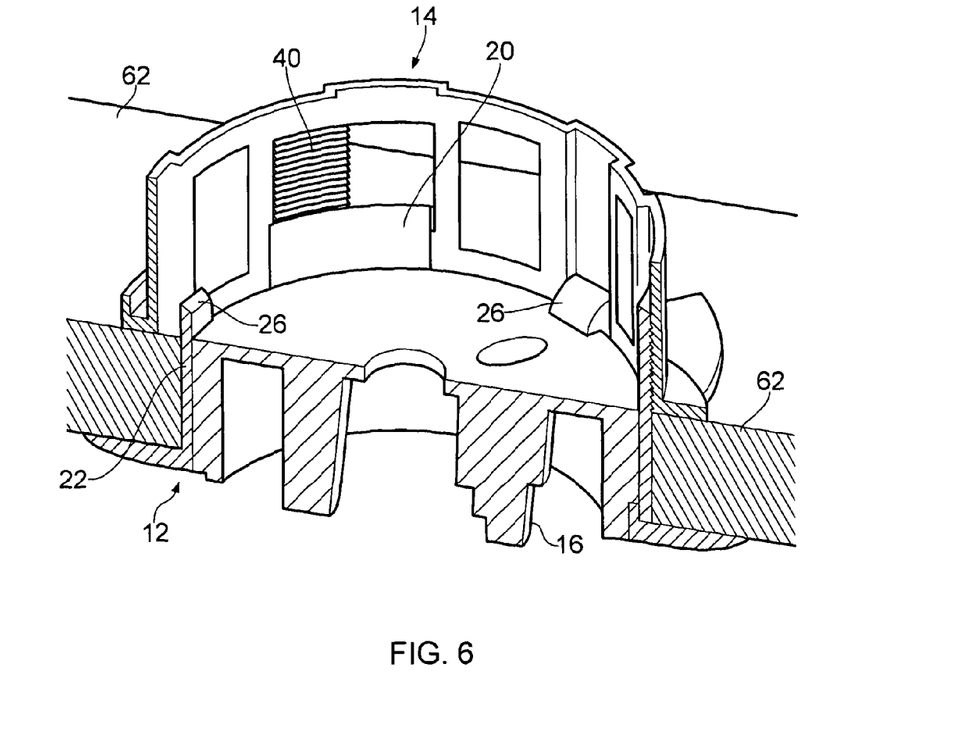
FIG. 6 is a cross-sectional view of an electrical component installed in a mounting unit mounted on a panel.

The arms 22 are narrower than the arms 20 and, as a consequence, are more flexible. Each arm 22 includes a locking wedge 26 extending inwardly from the end of the arm. The locking wedge 26 acts to secure the electrical component 16 when in use, and the function of the arms 22 and the locking wedge 26 will be discussed in greater detail in conjunction with FIG. 6.

The wall 18 and the arms 20, 22 define a substantially circular hole, arranged to receive the electrical component. Although, in this embodiment, the hole, the mounting unit 10 and the electrical component 16 are substantially circular in shape, a person skilled in the art will appreciate that they could be any shape.

A wedge-shaped protrusion 28 extends outwardly from the wall 18 at the base of each arm 20, 22. The wedges 28 ensure that the bezel 12 of the mounting unit 10 fits snugly into a hole in the panel to which the mounting unit is to be mounted.

On the inner surface of the wall 18, a number of axial teeth 30 extend from the bezel ring 15. The teeth 30 are arranged to be received by a complimentary recess on an outer surface of an electrical component 16 (see FIG. 3) to be mounted in the mounting unit 10 to prevent rotation of the electrical component relative to the mounting unit. In the embodiment of the invention described herein, the mounting unit 10 comprises three upward pointing teeth 30, one extending from each of the arms 20. However, it will be apparent to a person skilled in the art that more or fewer protrusions could be formed in the mounting unit 10 to achieve the same result. The teeth 30 will be discussed in greater detail with reference to the electrical component 16.

The clamp 14 of the mounting unit 10 comprises a circular ring 32, and a substantially cylindrical wall 34 extending upwards from an inner edge of the ring. The wall 34 comprises a number of radially recessed regions 36, 38 which correspond in terms of their approximate size and shape to the arms 20, 22 of the bezel 12 respectively. The wall 34 has, at each recess 36, a plurality of locking ridges 40, which complement the locking ridges 24 formed on the outer surface of each of the arms 20 on the bezel 12 of the mounting unit 10. The complementary locking ridges 24, 40 form connectors for connecting the bezel 12 and the clamp 14 to one another. A plurality of holes 42 are formed in the wall 34. The provision of the holes 42 results in less material being used in manufacturing the mounting unit 10. As a consequence, the weight of the clamp 14 of the mounting unit 10 is relatively small.

Three flanges 43 extend radially from the ring 32. Each flange includes a pair of cantilever arms 44 extending concentrically with respect to, the ring. Each cantilever arm 44 has a first end 44a, which is connected to a connecting member 46, and a free end 44b which is able to move a small distance in a direction perpendicular to the ring 32. A spike or spur (not shown) extends from the free end 44b of the cantilever arm 44 in a downward direction (i.e. the direction opposite to the direction in which the wall 34 extends from the ring). Each spur is arranged, in use, to engage the ceiling tile to which the mounting unit 10 is to be mounted, thereby restricting movement of the clamp 14 of the mounting unit.

A hole 45 is formed in each flange 43, for receiving a screw, a nail or the like, for securing the clamp 14 to the ceiling tile.

While, in the embodiment shown in FIG. 2, the holes 42 are formed in the wall 34 of the clamp 14, and the teeth 30 are formed on the bezel 12, it will be appreciated by a person skilled in the art that these, and any other features of the invention, could be located on any of the components.

In effect, the mounting unit 10 has an entrance at its top for insertion of an electrical component 16 such that the electrical component 16 can be secured within the mounting unit. An electrical component 16 can't be inserted from below.

Figure 3:
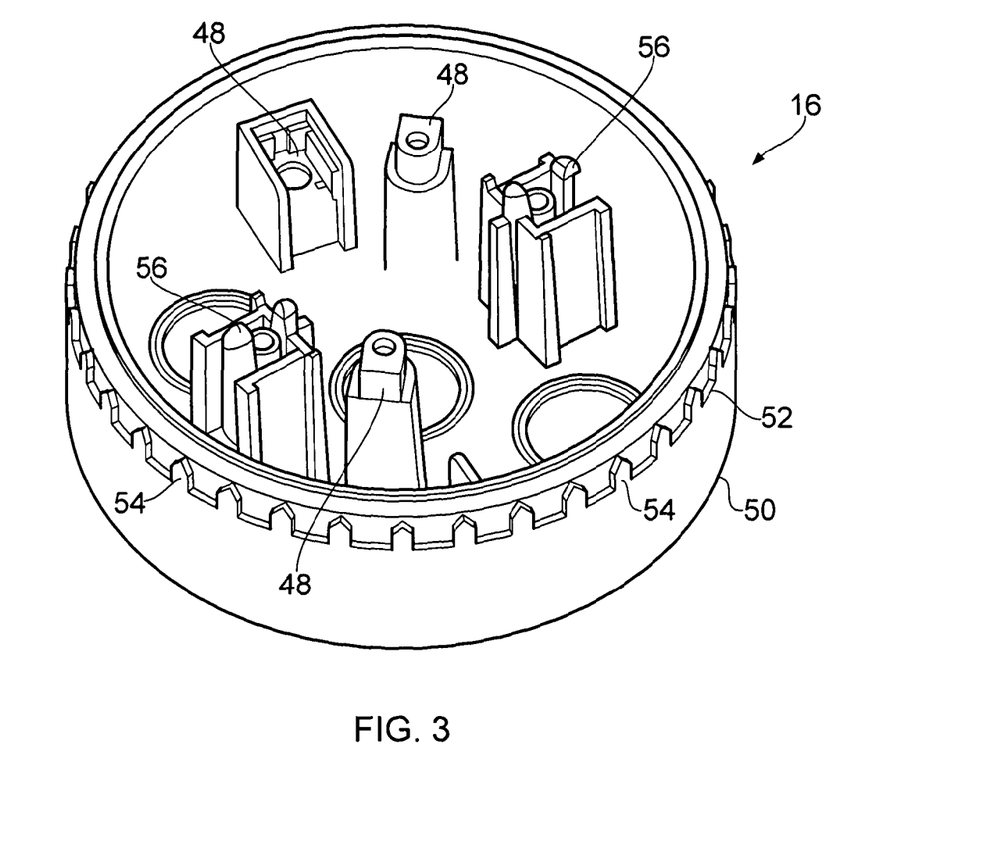
FIG. 3 is a perspective view of the electrical component shown in FIG. 1.

FIG. 3 shows the electrical component 16 to be mounted in the mounting unit. The electrical component 16 is substantially cylindrical, and has a diameter substantially the same as, but slightly smaller than, the diameter of the walls 18, 34 of the bezel 12 and the clamp 14 respectively. The electrical component 16 comprises electrical connections 48 for connecting the component to wiring. The wiring is connected to the connections 48 from behind, so that, when installed, the wiring is not visible from below the electrical component 16. An outer wall 50 of the electrical component includes a castellated region 52, formed of a plurality of teeth 54. The teeth 54 are the same size and shape as the teeth 30 formed on the bezel 12 of the mounting unit 10. The recesses between the teeth 54 are arranged to receive the protrusions 30 when the electrical component 16 is mounted in the mounting unit 10. The abutment of the teeth 30 and 54 restrict the rotation of the electrical component 16 relative to the mounting unit 10. In its mounted position on a ceiling, the teeth 54 of the electrical component 16 point downwards, towards the ground so that, as the component 16 is inserted from above, they engage with the upward pointing teeth 30 of the bezel 12.

The electrical component 16 includes clips 56 which are arranged to secure a cover (not shown) or an additional component to the electrical component. The additional component may comprise, for example, the sensing part of a detector, which clips onto the electrical component 16.

Figure 4:
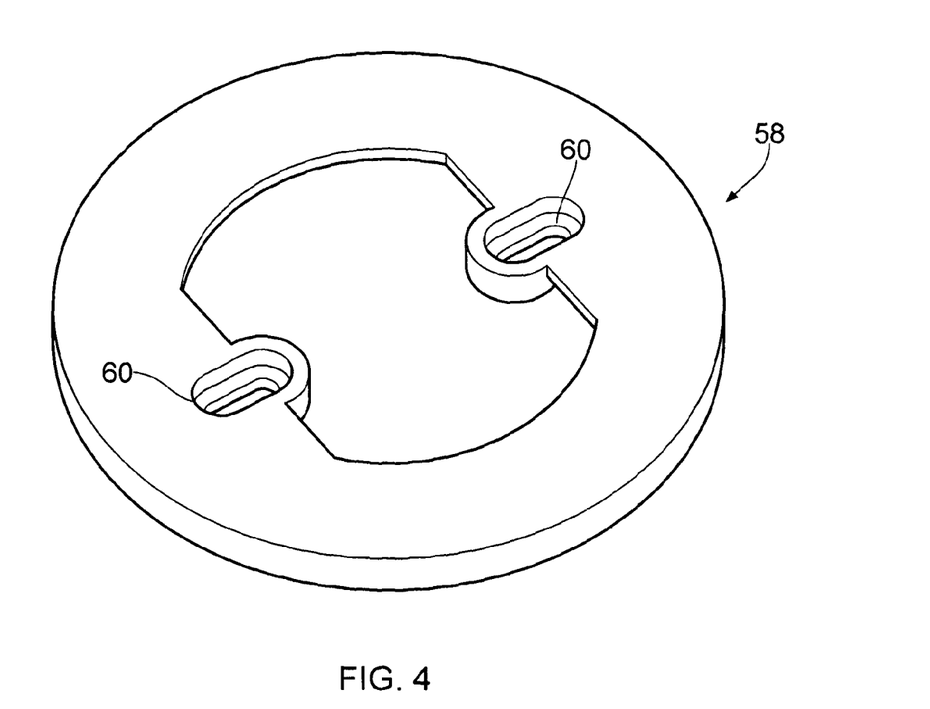
FIG. 4 is a perspective view of an adapter for use with the electrical component of FIG. 1.

An example of an alternative additional component which might be clipped onto the electrical component is shown in FIG. 4. The additional component is an adapter 58. Holes 60 in the adapter 58 receive the clips 56 on the electrical component 16, and secure the adapter to the component. The adapter 58 allows the connection of other components to the electrical component 16.

The use of the invention, that is the installation of the mounting unit 10 and the electrical component 16, will now be described with reference to the drawings. In this example, the electrical components are smoke detector back boxes, which are connected to ceiling tiles of a ceiling.

Once the desired location of each detector back box 16 to be installed in a building has been determined, an electrician will visit the building to connect the back boxes to an electricity supply. The wiring is in a cavity above where the ceiling will be installed, so that, once the ceiling has been installed, the wiring is not visible from below the ceiling. An additional component is then connected to the back box 16. Typically, for a detector, the additional component is the sensor part of the detector. The additional component also provides a structure that can be grasped by the hand of the ceiling installer when the electrical component needs to be mounted.

A ceiling installer then visits the building to install the ceiling tiles. At ground level, the installer cuts a circular hole in each ceiling tile that corresponds to a desired location of a detector. Each hole has a diameter equal to that of the wall 18 of the bezel 12. The installer then inserts the arms 20, 22 extending from the wall 18 of the bezel 12 through the hole in the ceiling tile, so that the flat surface 15a of the bezel ring 15 abuts the lower surface of the ceiling tile around the hole.

Referring again to FIG. 1, the clamp 14 of the mounting unit 10 is positioned as shown, on the upper side of the ceiling tile (not shown), so that the arms 20, 22 of the bezel 12 are aligned with the corresponding recesses 36, 38 in the clamp 14. The clamp 14 is then pushed onto the bezel 12 in a direction A, sandwiching the ceiling tile between the clamp and the bezel. Since the installer is able to mount the mounting unit 10 to the ceiling tile at ground level, he is easily able to see both sides of the ceiling tile, and to align the arms 22, 24 and recesses 36, 38.

As the locking ridges 24 on the bezel 12 engage the corresponding locking ridges 40 on the clamp 14, the complementary ridges form a ratchet-type lock, which restricts any movement of the clamp 14 in a direction opposite to the direction A. The ratchet design is simple to use, being linearly arranged so that the clamp is simply pushed onto the bezel. The clamp 14 is pushed onto the bezel 12 until the spurs extending from the cantilever arms 44 engage, and penetrate, the ceiling tile 62 onto which the mounting unit 10 is being mounted (see FIG. 5). The bezel 12 and clamp 14 lock together as soon as the first of the locking ridges 24, 40 engage each other. As a result, the mounting unit 10 is capable of being mounted to any ceiling tile or panel having a range of thicknesses.

When the bezel 12 and the clamp 14 of the mounting unit 10 are in their mounted configuration, each of the arms 20, 22 is located within a corresponding recess 36, 38 and, therefore, relative rotation of the bezel and clamp is restricted. Rotation of the mounting unit 10 relative to the ceiling tile 62 to which it is mounted is restricted by the spurs which engage the tile.

If, after the mounting unit 10 has been mounted to a ceiling tile 62, it is desirable to separate the bezel 12 and clamp 14, to remove the mounting unit from the tile, then one may apply pressure to the arms 20 through the holes 42 adjacent to the locking ridges 40 on the clamp 14 of the mounting unit 10. Applying pressure to the fingers 20 causes the locking ridges 24, 40 to be separated, and allows the clamp 14 to be lifted off the bezel 12, in a direction opposite to the direction A.

Once the mounting unit 10 has been mounted to a ceiling tile 62, the ceiling tile is installed. The installer, positioned below the ceiling tile 62 then reaches through the hole in the middle of the mounting unit 10, formed by the cylindrical walls 18, 34, and pulls the electrical component 16 from above the ceiling tile into the mounting unit. As the electrical component 16 is pulled into the mounting unit 10, the arms 22 of the bezel 12 are urged outwards, such that the locking wedges 26 move over the sides of the electrical component. As the electrical component 16 nears its mounted position in the mounting unit 10, the teeth 54 formed on the outer wall 50 of the back box engage the teeth 30 formed on the inner surface of the wall 18 of the bezel 12. If the teeth 30 of the bezel are not aligned with a gap between adjacent teeth 54 of the back box 16, then the back box is caused to rotate relative to the bezel, until such alignment is achieved. When the alignment of the teeth 30, 54 in this way is achieved, the installer is able to pull the electrical component 16 completely into the mounting unit 10

The electrical component 16 clicks into its mounted position (shown in FIG. 6), with the sides of the back box fitting between the base of the wall 18 (not visible in FIG. 6) and the lower surface of the locking wedges 26. When the electrical component 16 is in this position, the arms 22 return to their original position, and the locking wedges 26 retain the back box in the mounting unit 10.

An advantage of this method of installing the electrical component is that the ceiling installer is able to carry out the installation easily. Furthermore, cutting a hole in the ceiling tile and mounting the mounting unit can be done at ground level. The only part of the installation process that must be carried out at ceiling level, once the ceiling tile has been installed is pulling the back box 16 into position in the mounting unit 10. For that part of the process, the installer only needs to use one hand, which has large safety benefits.

Figure 7:
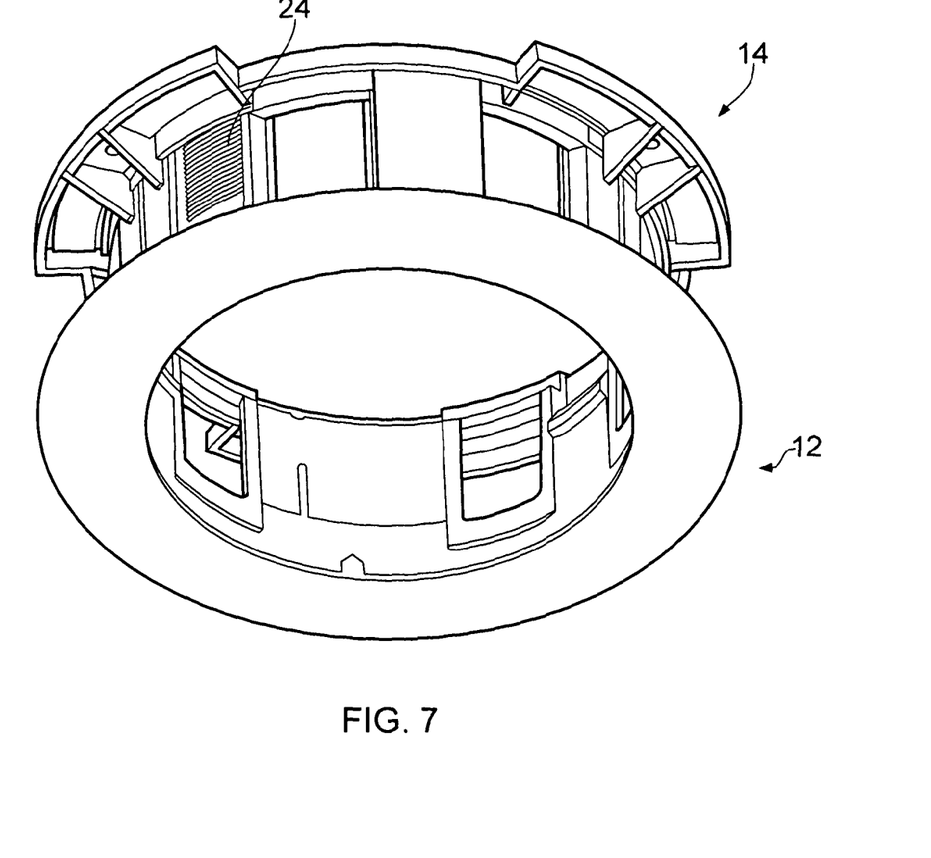
FIG. 7 is a perspective view of the first and clamps of the mounting unit shown in FIG. 1 in an alternative configuration.

The configuration of the various parts of the mounting unit 10 is particularly advantageous in terms of how the first and clamps 12, 14 can be arranged for packing and transportation, when it is not installed in a ceiling tile. By turning the clamp 14 of the mounting unit upside down, one is able to mount it onto the bezel 12 without the locking ridges 24, 40 engaging one another and, therefore, without the two parts becoming secured together. FIG. 7 shows how the bezel 12 and the clamp 14 can be positioned together in an unsecured manner. Since the clamp 14 is turned upside down, the locking ridges 40 are not aligned with the locking ridges 24 formed on the bezel 12. The arms 20, 22 of the bezel 12 fit into the corresponding recesses 36, 38 in the clamp 14, but the locking ridges 24, 40 are adjacent to one another, rather than being interlocked. In this configuration, the mounting unit 10 is conveniently compact for packaging and transporting.

It will be appreciated by a person skilled in the art that various modification may be made to the invention without departing from the scope of the claims.

The invention claimed is:

1. A mounting unit for mounting an electrical component to a panel comprising:
   a first member arranged to engage a lower side of said panel, the first member being a bezel; and
   a second member comprising a ring arranged to abut an upper, opposite side of said panel, the second member arranged to engage the first member, so as to secure the first and second members to opposite sides of the panel through a hole in the panel;
   wherein the mounding unit comprises complementary ratchet portions for securing the first and second members to one another, the mounting unit being arranged such that the first and second members may be mounted together in a first position in which the ratchet portions engage, and in a second position in which the ratchet portions do not engage, and wherein the first and second members define a space for receiving the electrical component from above the mounting unit.

2. A mounting unit according to claim 1, wherein neither the first member nor the second member is an electrical component.

3. A mounting unit according to claim 1, wherein the mounting unit comprises a connector for securing the members to one another.

4. A mounting unit according to claim 1, wherein one of the first and second members comprises a plurality of locking ridges, the slope of which extends in a first direction, and the other of the first and second members comprises one or more locking ridges, the slope of which extends in a second direction substantially opposite to the first direction.

5. A mounting unit according to claim 1, wherein the bezel comprises a bezel ring arranged to abut the panel to which the mounting unit it is to be fitted.

6. A mounting unit according to claim 1, further comprising a rotation restrictor for restricting rotation of the electrical component relative to the mounting unit.

7. A mounting unit according to claim 6, wherein the rotation restrictor comprises at least one tooth in one member, arranged to engage a complementary recess in the other.

8. A mounting unit according to claim 1, further comprising a catch for securing the electrical component thereto.

9. A mounting unit according to claim 8, wherein the catch comprises at least one cantilever arm, the or each arm being arranged to engage and secure the electrical component to the mounting unit.

10. A mounting unit according to claim 8 or claim 9, wherein the catch comprises a snap-fit arrangement.

11. A mounting unit according to claim 1, wherein the second member comprises a ring arranged to abut the panel to which the mounting unit it is to be fitted.

12. A mounting unit according to claim 1, further comprising a panel locator for restricting rotational movement of the mounting unit relative to said panel.

13. A mounting unit according to claim 12, wherein the second member comprises at least one hole for receiving a screw for securing the second member to the panel.

14. A mounting unit according to claim 12 or claim 13, wherein the panel locator comprises a spur arranged to engage said panel in use.

15. A mounting unit according to claim 1, further comprising a resilient arm arranged to engage said panel in use.

16. A mounting unit according to claim 14, when dependent from claim 13, wherein the spur extends substantially perpendicularly from the resilient arm.

17. A mounting unit according to claim 16, wherein the second member comprises a hole adjacent to the means for securing the members to one another.

18. A mounting unit according to claim 1, wherein the first and second members of the mounting unit are shaped such that relative rotation of said members is restricted.

19. A mounting unit according to claim 18, wherein a protrusion is formed on one of the first and second members, and a complementary recess is formed on the other of the first and second members.

20. A mounting unit according to claim 1, wherein said panel is a ceiling tile.

21. An electrical component for mounting in the mounting unit of claim 1.

22. An electrical component according to claim 21, comprising a restrictor for restricting rotation thereof relative to the mounting unit.

23. An electrical component according to claim 22, wherein the rotation restrictor comprises a protrusion arranged to abut a complimentary protrusion on the mounting unit.

24. A mounting unit according to claim 1, wherein the ratchet portions are arranged circumferentially around the surface of the first and second members.

25. A mounting unit according to claim 18, wherein a plurality of protrusions are formed on one of the first and second members, and a plurality of complementary recesses is formed around a circumference on the other of the first and second members.

26. An electrical component according to claim 22, wherein the restrictor comprises castellations formed around a circumference of the electrical component.

* * * * *

UNITED STATES PATENT AND TRADEMARK OFFICE
CERTIFICATE OF CORRECTION

PATENT NO. : 9,343,884 B2
APPLICATION NO. : 13/877038
DATED : May 17, 2016
INVENTOR(S) : Meah et al.

It is certified that error appears in the above-identified patent and that said Letters Patent is hereby corrected as shown below:

In the Claims

In Claim 1, column 8, line 61, delete "mounding" and insert --mounting--.

In Claim 9, column 9, line 28, delete "the or each arm".

Signed and Sealed this
Ninth Day of August, 2016

Michelle K. Lee
*Director of the United States Patent and Trademark Office*